United States Patent [19]

Wissbroecker

[11] Patent Number: 4,763,386
[45] Date of Patent: Aug. 16, 1988

[54] FISH SCALING APPARATUS

[76] Inventor: Herman A. Wissbroecker, Star Rte., Box 135, Pearson, Wis. 54462

[21] Appl. No.: 82,819

[22] Filed: Aug. 6, 1987

[51] Int. Cl.$^4$ .............................................. A22C 25/02
[52] U.S. Cl. ........................................................ 17/64
[58] Field of Search ................... 17/64, 67, 51, 11.1 R, 17/65; 241/84.4, 86.2; 99/630, 607, 608

[56] References Cited

U.S. PATENT DOCUMENTS

| | | | |
|---|---|---|---|
| 1,886,061 | 11/1932 | Speidel | 99/630 |
| 2,653,345 | 9/1953 | Kaplan. | |
| 2,860,371 | 11/1958 | Krull. | |
| 3,304,574 | 2/1967 | Ham et al. | |
| 3,751,765 | 8/1973 | Reeves et al. | |
| 3,872,544 | 3/1975 | Lange. | |

FOREIGN PATENT DOCUMENTS

| | | | |
|---|---|---|---|
| 437620 | 11/1926 | Fed. Rep. of Germany | 17/64 |
| 469506 | 12/1928 | Fed. Rep. of Germany | 17/65 |

*Primary Examiner*—Willie G. Abercrombie
*Attorney, Agent, or Firm*—Andrus, Sceales, Starke & Sawall

[57] ABSTRACT

A fish scaling apparatus includes a container having a bottom and an upstanding side wall, and a cylindrical insert including a plurality of inwardly-extending projections. The projections in the insert into the interior of the insert, and are provided with a rough or sharp edge. A paddle member is disposed within the interior of the cylindrical insert, and is connected to a shaft extending exteriorly of the container. The shaft is adapted for connection to the chuck of a portable drill. When the drill is operated, rotation of the paddle member is caused within the interior of the cylindrical insert. Such rotation causes fish disposed within the interior of the cylindrical insert to come into contact with the inwardly-extending projections disposed on the side wall of the cylindrical insert, for removing the scales from fish. The paddle member may also be provided with a series of spaced projections for aiding in the removal of scales from the fish during agitation.

12 Claims, 1 Drawing Sheet

FISH SCALING APPARATUS

BACKGROUND AND SUMMARY

This invention relates to an apparatus for the scaling of fish, and more particularly to such an apparatus which utilizes a rotary action for removing the scales from fish.

It is known to provide rotary-type devices for removing scales from fish. Such prior devices, however, generally involve rotation of a drum which contains the fish to be scaled. This type of fish scaling apparatus is shown in U.S. Pat. No. 3,304,574 to Ham et al.

Known automatic fish scaling devices for simultaneously scaling a quantity of fish require a dedicated power source for providing the rotary action. For example, U.S. Pat. No. 860,371 to Krull shows a tub-type fish scaler with an electric motor for providing rotary motion of a rotor disposed in the bottom of a tub.

In contrast, the present invention provides a fish scaling apparatus in which the fish are contained within a fish-holding cavity of a stationary container. The fish scaling apparatus of the invention utilizes a portable power source, such as a one-speed or variable-speed electric drill. Furthermore, the present invention provides a scale-removing system arranged in a novel and unique manner, which provides a quick and effective scale removal.

In accordance with the invention, a fish scaling apparatus includes a container having one or more side walls defining a fish-holding cavity for holding a plurality of fish and a quantity of water therein. An agitating means, such as a paddle, is disposed within the cavity for agitating the fish and causing the fish to come into contact with the wall of the cavity. The cavity wall is provided with scaling means projecting into the cavity, so that as the fish come into contact with the scaling means during agitation, the scales of the fish are removed.

In one embodiment, a cylindrical insert adapted for placement within a bucket to define a fish-holding cavity includes a plurality of projections in its side wall, each of which project into the fish-holding cavity. The projections are provided with a rough or sharp edge or surface, which removes the scales from fish as the fish come into contact with the side wall of the insert during agitation. The agitating means is preferably a paddle disposed on a shaft which projects from the fish-holding cavity. The shaft is engageable with the chuck of a portable electric drill. Upon operation of the drill, the shaft is rotated to thereby rotate the paddle, thereby causing agitation in the fish-holding cavity and causing the fish to come into contact with the side wall of the insert. In one embodiment, the paddle is substantially S-shaped, and the outwardly curved portions of the S-shaped paddle are provided with a plurality of projections. The projections on the paddle are also provided with a rough or sharp edge, which aids in the removal of scales from the fish during agitation.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
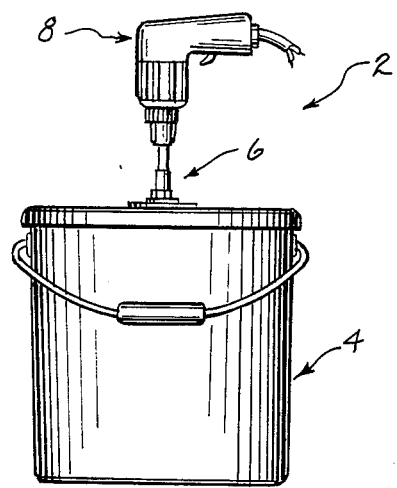
FIG. 1 is a side elevation view showing the fish scaling apparatus of the present invention.

As shown in FIG. 1, a fish scaling apparatus 2 generally includes a container 4, an agitator 6, and a means for imparting rotation to agitator 6, such as a portable electric drill 8.

Figure 2:
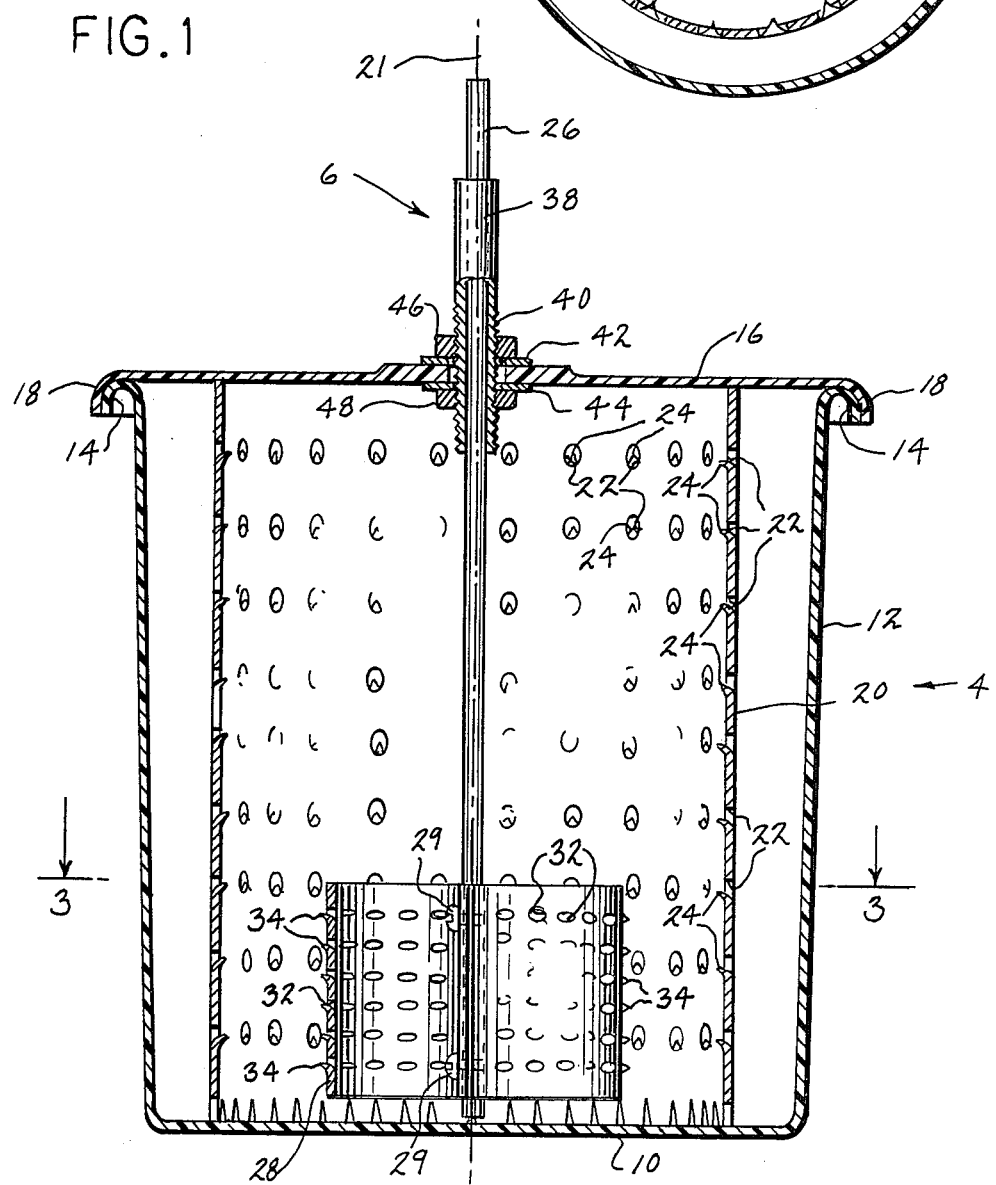
FIG. 2 is a longitudinal cross section view of the fish scaling apparatus of FIG. 1, with portions broken away for clarity.

Referring now to FIG. 2, it is seen that container 4 includes a bottom wall 10 and an upstanding peripheral side wall 12. Container 4 is preferably cylindrical in shape. The top of side wall 12 is provided with a lip 14 therearound. A cover 16 having a depending edge 18 therearound is adapted for placement atop lip 14 for enclosing container 4.

A cylindrical insert 20 is adapted for placement within the interior of container 4. Container 4 and cylindrical insert 20 both extend along and are substantially symmetrical about a longitudinal axis 21. Cylindrical insert 20 includes a plurality of spaced openings 22 formed about its periphery and along its length. Openings 22 are punched through the side of cylindrical insert 20, to form a plurality of inwardly-extending projections 24, which extend into the interior of cylindrical insert 20. Projections 24 present a rough or sharp surface facing toward the interior of the cylindrical insert 20.

Agitator 6 includes a shaft 26 having a paddle 28 connected to its lower end, such as by screws 29.

Figure 3:
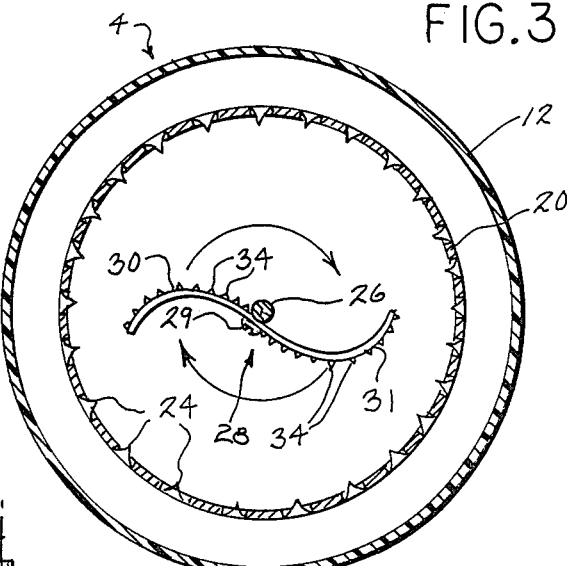
FIG. 3 is a section view taken generally along line 3—3 of FIG. 2.

As shown in FIG. 3, paddle 28 is substantially S-shaped when viewed edgewise along longitudinal axis 21, and includes outwardly curved surfaces 30, 31. Paddle 28 is adapted for clockwise rotation within the interior of cylindrical insert 20, so that during rotation paddle 28 leads with its outwardly curved surfaces 30, 31. Outwardly facing curved surfaces 30, 31 of paddle 28 are provided with a series of spaced openings 32 along the length and height of paddle 28. Openings 32 in paddle 28 are punched therethrough to provide a plurality of projections 34 facing outwardly from paddle 28. Openings 32 are formed such that projections 34 extend outwardly away from outwardly curved portions 30, 31 of paddle 28. Projections 34 each provide a rough or sharp surface facing outwardly from curved portions 30, 31.

Referring again to FIG. 2, shaft 26 extends through cover 16 provided atop container 4. Cover 16 includes a central opening for accommodating the passage of shaft 26 therethrough.

A bushing assembly 36 is provided at the central opening in top 16. Bushing assembly 36 includes a sleeve 38 having a set of external threads 40 along at least a portion of its length. The threaded portion of sleeve 38 is adapted for placement through the central opening in cover 16. A washer 42 is placed adjacent the top side of cover 16, and a washer 44 is placed adjacent the bottom side of cover 16. A nut 46 is then threaded onto threads 40 of sleeve 38, and brought into contact with washer 42. A nut 48 is threaded onto threads 40 of sleeve 38 from the underside of cover 16, and is tightened down against washer 44. This arrangement locks sleeve 38 onto top 16, and provides a passage for shaft 26 therethrough. The upper end of shaft 26 is engageable with the chuck portion of electric drill 8, which causes rotation of shaft 26 and therefore paddle 28.

To operate the fish scaling apparatus of the present invention, a quantity of fish to be scales is placed within the interior of cylindrical insert 20 located within container 4. A quantity of water is then placed within container 4 to cover the fish placed in the interior of cylindrical insert 20. Openings 22 in cylindrical insert 20 allow the water to pass from the exterior into the interior of cylindrical insert 20.

Thereafter, cover 16, including agitator assembly 6, is positioned over and engaged with lip 14 of container 4. In this manner, paddle 28 is disposed at or adjacent the location of the fish contained within cylindrical insert 20. The upper end of shaft 26 is then fixed within the chuck of electric drill 8, after which drill 8 is operated so as to rotate shaft 26. Upon rotation of shaft 26, paddle 28 is likewise rotated within cylindrical insert 20.

Rotation of paddle 28 causes the fish to come into contact with the wall of cylindrical insert 20. Upon such contact, the sharp or rough surface of projections 24 formed in the wall of cylindrical insert 20 act to remove the scales from the fish. Likewise, projections 34 formed by openings 32 in paddle 28 also act to remove the scales from the fish during rotation of paddle 28. When a large number of fish are placed within cylindrical insert 20, paddle 28 may be moved in an up and down manner to ensure that all fish are properly scaled during agitation of paddle 28. This action quickly and effectively removes the scales from any number of fish, limited only by the size of container 4 and the volume of fish capable of being placed into the interior of cylindrical insert 20.

The bottom of cylindrical insert 20 is provided with a plurality of slits 25 which are bent inwardly to bite into bottom 10 of container 4 to prevent rotation of cylindrical insert 20 during agitation.

It should be appreciated that insert 20 can be eliminated by providing projections 24 on side wall 12 of container 4.

The above-described fish scaling apparatus provides an inexpensive and efficient means for scaling of fish. The feature of the invention wherein the user supplies the power source for the apparatus eliminates the necessity for a dedicated power source, thereby greatly reducing its cost and increasing its availability to those who could not otherwise afford an automatic fish scaler.

Various alternatives are contemplated as being within the scope of the following claims particularly pointing out and distinctly claiming the subject matter regarded as the invention.

I claim:

1. A fish scaling apparatus, comprising:
    a container having a bottom and a closed upstanding side wall extending therefrom and adapted to receive a quantity of water therein;
    an insert adapted for placement within said container, said insert being adapted for placement on the bottom of said container and having a closed upstanding side wall which, when placed within said container, defines a fish-holding cavity for holding a plurality of fish therein, said insert having a transverse dimension less than that of said container so that a gap is formed between said upstanding side wall of said insert and said upstanding side wall of said container, said insert including passage means for allowing water within said container to pass into said fish-holding cavity;
    agitating means disposed within said fish-holding cavity for agitating fish contained within said fish-holding cavity and causing said fish to come into contact with said upstanding side wall of said insert; and
    scaling means comprising a plurality of projections formed on the upstanding side wall of said insert and extending inwardly into said fish-holding cavity for removing scales from fish as said fish contact said upstanding side wall of said insert during agitation by said agitating means.

2. The invention according to claim 1, wherein said passage means comprises a series of openings formed in said insert, and wherein said plurality of projections extending inwardly into said fish-holding cavity comprises a sharp edge formed adjacent each said opening and extending inwardly into said fish-holding cavity for removing scales from said fish during agitation.

3. The invention according to claim 1, wherein said agitating means comprises paddle means disposed within said cavity and adapted for rotatable movement therein for agitating said fish within said cavity.

4. A fish-scaling apparatus, comprising:
    a container including a wall defining a fish-holding cavity within said container for holding a plurality of fish and a quantity of water therein;
    scaling means disposed on said wall of said cavity and projecting into said cavity; and
    agitating means disposed within said cavity for agitating said fish therein and causing said fish to come into contact with said wall of said cavity, said agitating means comprising a paddle connected to a shaft extending into said cavity and adapted for rotatable movement therein, said paddle extending less than the full length of said cavity and being capable of up-down movement within said cavity in response to up-down movement of said shaft.

5. The invention according to claim 4, wherein said shaft is adapted to be received into the chuck of a portable drill so that said drill may be used to rotate said paddle within said cavity.

6. The invention according to claim 4, wherein said container is provided with a cover, and wherein said paddle means is attached to a shaft extending along said paddle axis through said cover so that said shaft projects exteriorly of said cover.

7. The invention according to claim 6, wherein said cover is provided with a passage for receiving said shaft, and further comprising means connected to said cover for fixing the location of said shaft relative to said cover.

8. The invention according to claim 7, wherein said means connected to said cover comprises a sleeve extending through said cover and adapted to receive said shaft to accommodate passage of said shaft through said cover.

9. A fish scaling apparatus, comprising:
    a container including a wall defining a fish-holding cavity within said container for holding a plurality of fish and a quantity of water therein;
    scaling means disposed on said wall of said cavity and projecting into said cavity; and
    agitating means disposed within said cavity for agitating said fish therein and causing said fish to come into contact with said wall of said cavity, said agitating means comprising a paddle having scaling means disposed thereon for aiding in the removal of said scales from said fish during agitation of said fish by said paddle.

10. The invention according to claim 9, wherein said paddle extends along a paddle axis and includes portions extending outwardly therefrom, and wherein said scaling means comprises a plurality of openings formed in said outwardly extending portions of said paddle, said openings being formed so as to provide a sharp edge extending away from said paddle.

11. A fish scaling apparatus, comprising:
 a container including a wall defining a fish-holding cavity within said container for holding a plurality of fish and a quantity of water therein;
 scaling means disposed on said wall of said cavity and projecting into said cavity; and
 agitating means disposed within said cavity for agitating said fish therein and causing said fish to come into contact with said wall of said cavity, said agitating means comprising a paddle member having a length along a paddle axis and a width substantially perpendicular thereto, said paddle member including curved portions at its ends along its height so that said paddle member is substantially S-shaped when viewed along said paddle axis; and
 scaling means disposed on said paddle member for scaling said fish during agitation.

12. The invention according to claim 11, wherein said S-shaped paddle member is provided with scaling means disposed thereon, said scaling means comprising openings formed in said curved portions of said paddle member and formed so that said openings form a sharp edge facing outwardly from the curved portions of said paddle member.

* * * * *